May 27, 1941.  W. P. SCHMITTER ET AL  2,243,224
VARIABLE SPEED TRANSMISSION
Filed Sept. 11, 1936
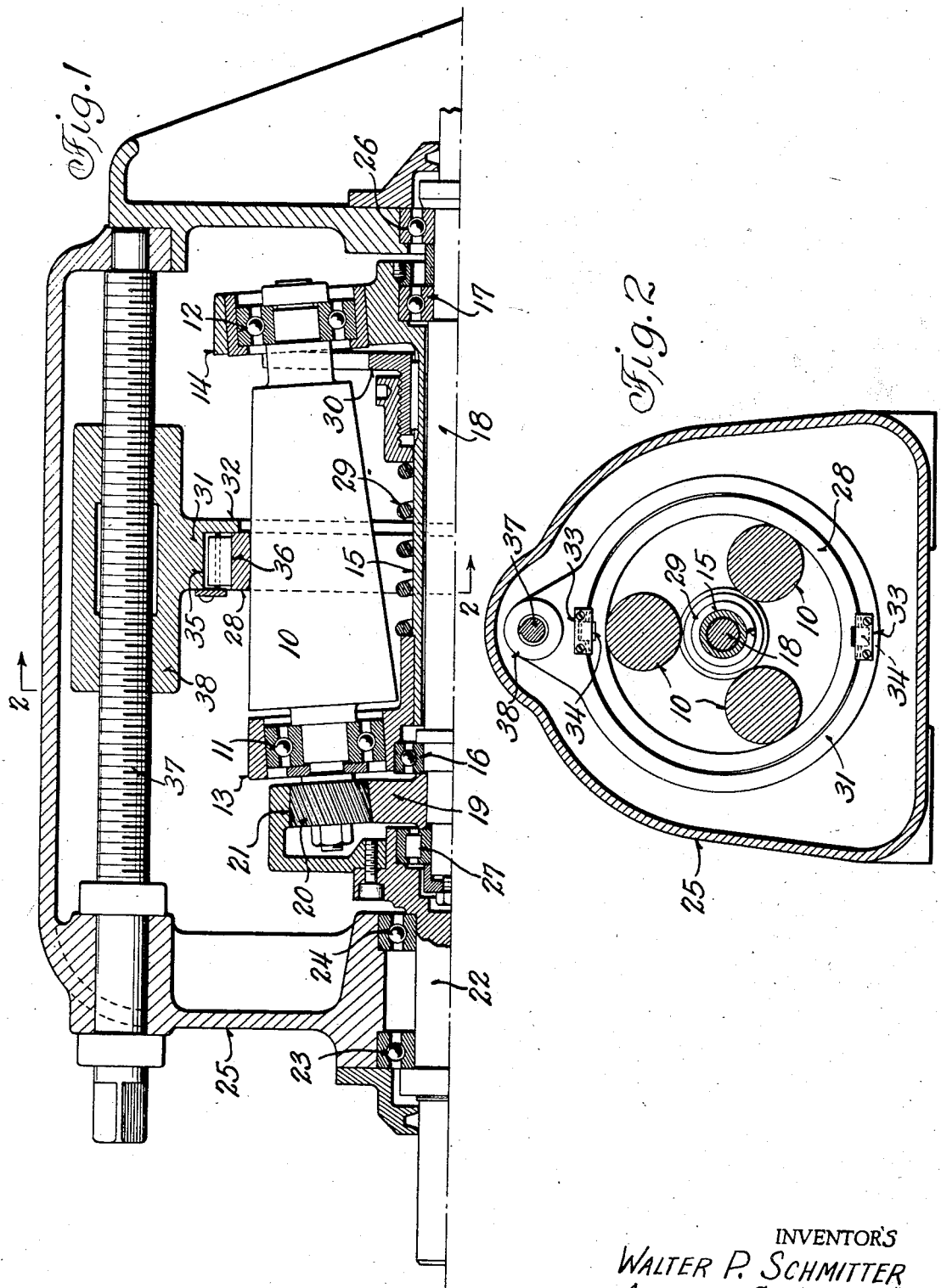
INVENTORS
WALTER P. SCHMITTER
BY ALFRED G. BADE
ATTORNEY.

Patented May 27, 1941

2,243,224

UNITED STATES PATENT OFFICE 2,243,224

VARIABLE SPEED TRANSMISSION

Walter P. Schmitter and Alfred G. Bade, Milwaukee, Wis., assignors to The Falk Corporation, Milwaukee, Wis., a corporation of Wisconsin Application September 11, 1936, Serial No. 100,270

9 Claims. (Cl. 74—281)

This invention relates to variable speed transmissions of the type involving a plurality of tapered planet rollers driven by a sun gear and controlled by an encircling traction ring which is adjustable in a manner to engage the planets at any of a plurality of points in the length thereof.

Our copending application, Serial No. 52,095, filed November 29, 1935, discloses a variable speed transmission of this type wherein the planet rollers are urged outwardly against the traction ring to effect the desired contact pressures between the rollers and ring, so that it is free to readily center itself with respect to the group of rollers. In the device therein shown the carrier ring is rendered floatable by mounting it for movement along one diameter in an intermediate ring, the latter being mounted for movement along another diameter in a radially fixed carrier ring which is mounted for adjustment along a pair of parallel supporting rods.

An object of the present invention is to provide a simplified and improved means for floatably mounting the traction ring in a variable speed transmission of the type mentioned.

Other more specific objects and advantages of the invention will appear, expressed or implied, from the following description of an illustrative embodiment of the present invention.

In the accompanying drawing:

Figure 1 is a fragmentary longitudinal sectional view of a variable speed transmission constructed in accordance with the present invention.

Fig. 2 is a transverse sectional view on a reduced scale, taken substantially along the line 2—2 of Fig. 1.

The variable speed transmission shown comprises a set of inclined tapered planet rollers 10, each journalled at opposite ends in appropriate bearings 11 and 12 provided in the end heads 13 and 14 of a rotary carrier 15. The carrier is supported on bearings 16 and 17 fixed on a drive shaft 18, the latter carrying a sun gear 19 which meshes with and drives pinions 20, each fixed to an end of one of the rollers 10. The pinions 20 mesh with an internal gear 21, fixed to the end of a driven shaft 22, so that shaft 22 is driven at a rate dependent upon the planetary action of the rollers 10 and pinions 20.

In this instance the driven shaft 22 is supported in spaced bearings 23 and 24 in one end of a suitable casing 25, and the drive shaft 18, aligned with the driven shaft, is supported in a bearing 26 in the other end of the casing and in a bearing 27 fixed in the adjacent end of the driven shaft.

The several rollers 10 are inclined relative to the shafts 18 and 22 at an angle equal to the angle of their taper and in such direction that their outer extremities are parallel and lie in an imaginary cylinder coaxial with the shafts; and their planetary action is controlled by an encircling traction ring 28 against which they are pressed, the ring 28 being shiftable so as to contact the rollers at various points in their length. In this instance the rollers are forced outwardly by a spring 29 which acts through an axially movable spider 30 in a manner to force the rollers along their outwardly inclined axes.

The several parts thus far described are combined and arranged and function in the manner disclosed in the application hereinabove identified. In this instance however the traction ring 28 is mounted in a novel manner which will now be described.

The traction ring 28 is shown arranged within a carrier ring 31 of larger diameter having an internal flange 32 against which the ring 28 is seated, the ring 28 being retained by diametrically disposed plates 33 fixed to the carrier ring 32 by screws or otherwise. Each plate 33 also cooperates with the flange 32 to retain in place a key 34, seated in a recess 35 provided in the carrier ring 31 and projecting into a corresponding recess 36 formed in the traction ring, the keys 34 serving to hold the traction ring against rotation and at the same time permit the traction ring to shift along that diameter which passes through the keys.

The carrier ring 31 is supported upon and adapted to swing about the axis of a control rod or a shaft 37, so that the traction ring is also free to move with the carrier ring substantially along a diameter angularly disposed with respect to that diameter which passes through the keys 34. The traction ring is thus free to move radially in any direction.

For this purpose the carrier ring 31 is provided at its periphery with an integral axially extended nut 38 rotatably mounted on the rod 37 and internally threaded to engage threads on the rod. In this instance the rod 37 is journalled at its opposite ends in the upper portion of the casing so as to support the carrier ring 31, and so as to cause travel of the rings 31 and 18 along the rollers 10 by rotation of the rod.

Various changes may be made in the embodiment of the invention hereinabove specifically described without departing from or sacrificing the advantages of the invention as defined in the appended claims.

We claim:
1. A variable speed transmission comprising a non-contractable traction ring, a plurality of tapered inclined planet rollers engaged with and within said ring, rotary carrier means for said rollers, a carrier ring with which said traction ring is connected for movement along one of its diameters, and a control rod about which said carrier ring is swingable in a direction transverse to said diameter, said rings being shiftable along said rollers in response to actuation of said rod to thereby regulate the planetary action of said rollers.

2. A variable speed transmission comprising a non-contractable traction ring, a plurality of tapered inclined planet rollers engaged with and within said ring, rotary carrier means for said rollers, a control rod disposed parallel to the axis of rotation of said carrier means, and ring shifting means rockable about the axis of said rod and movable along said rollers in response to actuation of said rod.

3. A variable speed transmission comprising a non-contractable traction ring, a plurality of tapered inclined planet rollers engaged with and within said ring, carrier means for said rollers rotatable therewith about a central axis, and means for shifting said ring along said rollers to regulate their planetary action, said last named means comprising a control member extending parallel to said axis, and a carrier for said ring freely swingable about the axis of said control member.

4. A variable speed transmission comprising a plurality of tapered relatively inclined rollers, means mounting said rollers for planetary movement about a common central axis, a control rod disposed parallel to said axis, and a non-contractable traction ring encircling and contacting said rollers, said traction ring being connected to said control rod for movement thereby lengthwise of said rollers to regulate their motion, said traction ring being also free to rock about the axis of said control rod in a plane perpendicular to said central axis.

5. A variable speed transmission comprising a plurality of tapered relatively inclined rollers, means mounting said rollers for planetary movement about a common axis, a non-contractable traction ring encircling and contacting said rollers, an actuator movable to shift said ring lengthwise of said rollers to regulate their motion, said ring being connected to said actuator for translatory movement along one only of its diameters, and means mounting said actuator to rock with said ring about an axis parallel to said first named axis.

6. In a variable speed transmission, the combination of a control element forming a circular track, a longitudinally tapered planetary member, means mounting said member in rolling engagement with said track, actuating means offset from the axis of said element for shifting said element lengthwise of said member to regulate the speed ratio of the transmission, said element being free to rock about an axis through said actuating means.

7. In a variable speed transmission, the combination of a circular control element, a plurality of longitudinally tapered planetary members, means mounting said members in rolling engagement with said element, a control rod disposed externally of and parallel to the axis of said element, an actuator for said element mounted upon said control rod, and shiftable with said element axially to regulate the speed ratio of the transmission, said element and said actuator being rockable about the axis of said control rod.

8. In a variable speed transmission, the combination of a circular control element, a plurality of longitudinally tapered planetary members, means mounting said members in rolling engagement with said element, control means connected to said control element and disposed externally of said axis and parallel thereto, said control element being moveable toward said control means along one of its diameters and being rockable about the axis of said control means in a direction transverse to said diameter, said control means being operable to shift said control element axially to regulate the speed ratio of the transmission.

9. In a variable speed transmission, the combination of a non-contractable traction ring, a plurality of tapered inclined planet rollers engaged with and within said ring, and means mounting said rollers and ring for relative movement in a direction axially of said ring to regulate the speed ratio of the transmission, said mounting means including a mounting element for said ring swingable about an axis laterally offset from the axis of said ring.

WALTER P. SCHMITTER.
ALFRED G. BADE.